(12) United States Patent
Amatucci et al.

(10) Patent No.: US 12,087,904 B2
(45) Date of Patent: Sep. 10, 2024

(54) ELECTROCHEMICAL CELL HAVING THIN METAL FOIL PACKAGING AND A METHOD FOR MAKING SAME

(71) Applicant: Rutgers, The State University of New Jersey, New Brunswick, NJ (US)

(72) Inventors: Glenn Amatucci, Peapack, NJ (US);
Irene Plitz, Toms River, NJ (US);
Linda Sung, Morris Plains, NJ (US);
Anthony Ferrer, Red Lion, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 18/125,550

(22) Filed: Mar. 23, 2023

(65) Prior Publication Data
US 2023/0231178 A1    Jul. 20, 2023

Related U.S. Application Data

(63) Continuation of application No. 15/769,270, filed as application No. PCT/US2016/059071 on Oct. 27, 2016.
(Continued)

(51) Int. Cl.
*H01M 10/0525* (2010.01)
*H01M 4/133* (2010.01)
(Continued)

(52) U.S. Cl.
CPC ....... *H01M 10/0525* (2013.01); *H01M 4/133* (2013.01); *H01M 4/38* (2013.01);
(Continued)

(58) Field of Classification Search
CPC .. H01M 50/10; H01M 50/102; H01M 50/103; H01M 50/105; H01M 50/107;
(Continued)

(56) References Cited

U.S. PATENT DOCUMENTS

| 5,449,575 A | 9/1995 | Moulton |
| 5,914,094 A | 6/1999 | Sun et al. |

(Continued)

FOREIGN PATENT DOCUMENTS

| EP | 1043783 A1 | 10/2000 |
| JP | 2008077846 A | 4/2008 |
| JP | 2001102090 A | 4/2013 |

*Primary Examiner* — Nathanael T Zemui
(74) *Attorney, Agent, or Firm* — Greenberg Traurig, LLP (57) ABSTRACT

An electrochemical cell is provided comprising a thin metal foil packaging made from at least one sheet of metal foil and having a perimeter extending around at least a portion of the electrochemical cell, as well as an electrochemical cell stack contained within the thin metal foil packaging, and a metal-to-metal welded seal around at least a portion of the perimeter of the thin metal foil packaging. The metal-to-metal welded seal is hermetic or nearly hermetic. Furthermore, the metal-to-metal welded seal is narrow, having a width of less than about 1 mm, and is less than about 5 mm away from the electrochemical cell stack. In some embodiments, the thin metal foil packaging functions not only as a hermetically or near hermetically sealed packaging, but also as either the negative or positive current collector, with one electrode of the cell bonded to the foil packaging. A method for making the foregoing electrochemical cell is also provided and involves using laser energy the metal-to-metal welded seal, wherein the laser energy is applied to the foil at high speed using a scanning laser.

14 Claims, 3 Drawing Sheets

Related U.S. Application Data (60) Provisional application No. 62/249,590, filed on Nov. 2, 2015.

(51) Int. Cl.
*H01M 4/38* (2006.01)
*H01M 4/66* (2006.01)
*H01M 10/058* (2010.01)
*H01M 10/0585* (2010.01)
*H01M 50/105* (2021.01)
*H01M 50/119* (2021.01)
*H01M 50/133* (2021.01)
*H01M 50/545* (2021.01)

(52) U.S. Cl.
CPC ......... *H01M 4/661* (2013.01); *H01M 10/058* (2013.01); *H01M 50/105* (2021.01); *H01M 50/119* (2021.01); *H01M 50/133* (2021.01); *H01M 50/545* (2021.01); *H01M 10/0585* (2013.01); *H01M 2220/20* (2013.01); *Y02E 60/10* (2013.01); *Y02P 70/50* (2015.11)

(58) Field of Classification Search
CPC .... H01M 50/109; H01M 50/11; H01M 50/14; H01M 50/141; H01M 50/143; H01M 50/145
See application file for complete search history.

(56) References Cited

U.S. PATENT DOCUMENTS

| | | |
|---|---|---|
| 2005/0175902 A1 | 8/2005 | Parsian |
| 2008/0131758 A1 | 6/2008 | Makovetski et al. |
| 2011/0195288 A1 | 8/2011 | Harima et al. |
| 2013/0295431 A1 | 11/2013 | Kwon et al. |
| 2014/0248528 A1 | 9/2014 | Takahata et al. |
| 2015/0010797 A1 | 1/2015 | Kim |
| 2015/0030912 A1 | 1/2015 | Nose et al. |
| 2015/0093629 A1 | 4/2015 | Sayre et al. |
| 2015/0099147 A1 | 4/2015 | Kong et al. |
| 2016/0093895 A1 | 3/2016 | Du et al. |
| 2016/0368078 A1 | 12/2016 | Wilkosz et al. |
| 2017/0207427 A1 | 7/2017 | Kouka et al. |

ELECTROCHEMICAL CELL HAVING THIN METAL FOIL PACKAGING AND A METHOD FOR MAKING SAME

CROSS-REFERENCE TO RELATED APPLICATIONS

This application is a Continuation Application of U.S. patent application Ser. No. 15/769,270, filed Apr. 18, 2018 which is related to and claims the benefit of commonly-owned PCT International Application No. PCT/US2016/059071, filed Oct. 27, 2016, which claims priority to and the benefit of U.S. Provisional Application No. 62/249,590 filed Nov. 2, 2015, the contents of each of the foregoing are herein incorporated by reference in its entirety.

STATEMENT OF GOVERNMENT FUNDING

This invention was made with government support under a contract from the US Government. The United States government has certain rights in the invention.

FIELD OF THE INVENTION

The present invention relates generally to electrochemical cells and a method for making same. More particularly, the present invention relates to electrochemical cells having more efficient metal foil pouch packaging.

BACKGROUND OF THE INVENTION

There continues to be great demand for efficient and long-lasting electrochemical energy storage systems, which are commonly known as batteries. There are ongoing efforts to develop batteries capable of storing larger amounts of energy per unit weight and per unit volume. Increasing the amount of energy stored per unit volume is significantly more important for smaller batteries (i.e., having capacity of 1-10 Ampere/hour (Ah) or even less) that are typically used for personal electronics, biomedical applications and other technologies.

Electrochemical cells are the most basic electrochemical energy storage unit. A battery may include a single electrochemical cell or multiple electrochemical cells, depending on its intended use. At a minimum, each electrochemical cell will include a positive electrode, a negative electrode and an electrolyte. Sometimes one or more separators are also included in between the electrodes, and may be impregnated with, or otherwise contain or hold, the electrolyte.

Additionally, depending on the chemistry involved, some electrochemical cells may also include positive and negative current collectors which are connected to, or in contact with, the positive and negative electrodes, respectively, to facilitate the flow of electric current during operation. The aforesaid functional components may be wound or stacked together to form an operational electrochemical cell. Typically, the wound or stacked components are enclosed or contained within a hermetic or nearly hermetic packaging or case which provides separation and protection from ambient conditions including moisture, oxygen, and contact with other materials. Where the electrolyte is a liquid or gel, the packaging or case will also serve to contain the electrolyte within the cell or battery.

A "hermetic" packaging is generally understood to be air tight, or impervious to gas flow, whereas "nearly hermetic" packaging is nearly air tight, or impervious to gas flow. Hermeticity of packaging will depend on packaging composition and thickness and may be quantified, for example, by measuring the water vapor transfer rate (WVTR), in grams per square meter per 24 hours (g/m2/24 hrs). Alternatively, there are established standardized tests for determining whether a packaging is sufficiently "hermetic" to serve as a container for electrochemical cells and batteries, including but not limited to Mil-STD-883 Test method 1014, Mil-STD-750 Test Method 1071 and the hybrid specification contained within Mil-PRF-38534. In general, it is widely recognized by those skilled in the art that seals comprised of polymeric compositions can never be considered to be truly hermetic due to the fundamental properties of polymers while inorganic defect-free components, such as metals, glasses, and ceramics, enable true hermeticity.

The majority of the efforts to date for optimizing electrochemical cell energy storage per unit volume have focused on improving the active materials used for making electrodes and electrolytes of electrochemical cells, especially in the case of lithium-based cells. For example, new positive and negative electrode materials have been developed for making lithium-based cells that produce much greater degrees of energy. However, when utilized in smaller electrochemical cells, especially those smaller than 1-10 Ah, the new electrode materials have not delivered the expected energy increases comparable to those seen in higher capacity cells. A significant reason for the lower than anticipated increase in overall battery energy density is believed to relate to inefficient packaging of the cells.

For electrochemical cells and batteries having capacities of less than about 10 Ah, there are generally three main types that include hermetic or nearly hermetic packaging or cases. These are cylindrical, prismatic and pouch types, which are described in detail in Chapter 35 of the Handbook of Batteries, $3^{rd}$ Ed. (see, Linden, David, and Reddy, Thomas B., eds. *Handbook of Batteries* (3rd ed. New York: McGraw Hill, 2002. 35.31-35.34 and 35.71-35.74), which is hereby incorporated by reference herein in its entirety. A cylindrical battery case generally consists of a cylindrical metal case which is either pre-welded or, in some cases, drawn through a forming process. Cylindrical battery cases are sealed using a small amount of near-hermetic polymeric sealant to contain the functional components of the electrochemical cell or battery and have very little excess volume therein. However, cylindrical batteries are not volumetrically efficient in design scenarios requiring electrochemical cells of thin format and, due to their round cross section, do not pack together efficiently. Prismatic batteries tend to have generally rectangular, oval or even oblong cross-sectional shapes, and have packaging or cases resembling metal boxes that are frequently formed by a deep drawing process. While prismatic batteries are also volumetrically efficient, they are not ideal for thin (i.e., less than a few millimeters thick) batteries because the thinness of the opening of the case is limited by the fabrication process and the thinness of the package wall is mechanically limited.

The pouch design is the third type of electrochemical battery design and was developed to address the problem of fabricating cells less than a few millimeters thick which are suitable for use in the personal electronics field, e.g., to produce batteries having capacity of 1-10 Ah or less. Pouch battery packaging is made of a flexible multilayer material that is typically heat sealed to enclose the electrochemical cell or cells therein, where the electrochemical cells tend to be in the form of an electrochemical cell stack which includes all the functional components described earlier. While pouch type cells are effective for thinner format applications, there are barriers to further improvement.

Much of the challenges relate to the polymeric near-hermetic seal which is utilized much more frequently in pouch cells relative to the aforementioned prismatic and cylindrical cells.

Typically, pouch packaging is made from laminated multilayer sheets, such as those described in Low-Cost Flexible Packaging for High-Power Li-Ion HEV Batteries by Jansen, A. N., et al., (see Jansen, A. N. K. Amine, and G. L. Henriksen. Low-Cost Flexible Packaging for High-Power Won HEV Batteries. United States: N. p., 2004. Web. doi:10.2172/828774.),), which is hereby incorporated by reference herein in its entirety. Conventionally, each laminated sheet includes at least a thermoplastic sealant layer, an intermediate thin metal barrier layer and a protective layer opposite the sealant layer. The thermoplastic sealant layer is a near hermetic, heat sealable, typically made from polyolefin or acid modified polyolefin, and becomes the inner side of the pouch after assembly. The intermediate thin metal barrier layer is a metal foil that provides a hermetic barrier surrounding the functional components to minimize escape of electrolyte solvents from the interior of the assembled pouch and entry of water into the pouch from the exterior environment. The external protective layer is typically a polymer coating which forms the external side of the pouch after assembly, and protects the metal layer from scratches and other damage that might allow passage of electrolyte and water. Sometimes, pouch packaging is formed using two of the laminated multilayer sheets that are aligned with the functional components in between and the sheets heat sealed on all four sides. In other embodiments, a single sheet is folded over so that there are only three free sides that need to be heat sealed to form the pouch, which increases the hermeticity of the overall pouch packaging. Pouch packaging made from laminated multilayer sheets having a metal foil layer have increased hermeticity compared to those made from sheets having only polymer-containing layers. However, since the heat seal of such conventional pouch packaging is formed by sealing the innermost polymer layer with itself, polymer is present in the seal and actually prevents a fully hermetic metal-to-metal seal from forming, which tends to decrease the overall hermeticity of the conventional pouch packaging.

Generally, volumetric inefficiencies arise with conventional multilayer pouch packaging materials for two reasons. The first reason is that conventional pouch packaging is relatively thick, commonly exceeding 100 to 300 microns. Since two sheets of the pouch packaging material are actually required (one for each side of the cell to form the pouch), the total thickness added to the electrochemical cell or battery by such pouch packaging alone is from about 200 microns to about 600 microns. If one is to make a thin battery of thickness less than 1 or 2 millimeters, or preferably even less than 500 microns, very little thickness is left for the electrochemical cell stack comprising the functional components. This then reduces the available capacity of the cell to operate electronics. Secondly, to form the pouch packaging around the electrochemical cell, the package must typically be sealed on at least three sides and these seals must be wide enough to ensure mechanical integrity of the seal, i.e., typically from about 3 to about 6 mm wide. An additional concern with the seals of conventional pouch packaging materials is that the innermost portion of the seals is occupied by the polymeric thermoplastic sealant layer and this inner layer offers limited resistance to the transfer of electrolyte solvents out of the package and water into the package. Accordingly, these seals do not provide acceptably hermetic seals unless they are of sufficient width and length (i.e., minimize the transfer of solvents and water into and out of the cell or battery) and, there is always the possibility of their failure over time. This also makes it necessary for these seals to have widths typically ranging from 3-6 mm. A third difficulty arise from the fact that the functional components of the electrochemical cell or battery are susceptible to thermal damage during the heat sealing process if the seals are formed too closely to the electrochemical cell stack. The combination of the thickness of conventional multilayer pouch materials with the wide thermal seals required to ensure mechanical and hermetic integrity severely limits the percentage of the total volume that can be allotted to the functional components of the electrochemical cell to well below 50% for thin small electrochemical cells and batteries.

It is believed that improvements to the design and manufacture of pouch battery packaging would further improve the capacity and performance of smaller electrochemical cells and batteries.

SUMMARY OF THE INVENTION

The present invention addresses all the aforementioned deleterious attributes of pouch cells when applying to thin small format cells. The present invention relates to electrochemical cells that employ an efficient integrated use of thin metal foil packaging and have a cell thickness of less than 1 millimeter. A unique aspect of the electrochemical cell, according to an embodiment of the present invention, is that the thin metal foil packaging functions not only as a hermetically or near hermetically sealed packaging, but also as either the negative or positive current collector, with one electrode of the cell bonded to the foil packaging. In one such embodiment, the free edges of the foil are extended slightly around the perimeter of the cell and are welded to one another to create a hermetic metal-to-metal bond. In an embodiment, laser energy is utilized to form such a seal, wherein the laser energy is applied to the foil at high speed using a scanning laser. This approach can create an excellent seal while reducing the risk of excessive thermal energy damaging the cell stack positioned within the metal foil pouch packaging.

In one embodiment, an electrochemical cell comprises a thin metal foil packaging comprising at least one sheet of metal foil and having a perimeter extending around at least a portion of the electrochemical cell, an electrochemical cell stack contained within the thin metal foil packaging, and a metal-to-metal welded seal around at least a portion of the perimeter of the thin metal foil packaging. The metal-to-metal welded seal is hermetic or nearly hermetic. Furthermore, the metal-to-metal welded seal is narrow, having a width of less than about 1 mm. The metal-to-metal welded seal of the electrochemical cell is less than about 5 mm away from the electrochemical cell stack.

In some embodiments of the electrochemical cell, the thin metal foil packaging is an outer current collector and the electrochemical stack comprises: an inner current collector; an inner electrode which is electrically connected to or in electrical contact with the inner current collector; first and second porous separators positioned adjacent to and on opposite sides of the inner electrode; a first outer electrode which is positioned on an opposite side of the first porous separator from the inner electrode, the first outer electrode also being adjacent to and electrically connected to, or in electrical contact with, the thin metal foil packaging; a second outer electrode which is positioned on an opposite side of the second porous separator from the inner electrode, the second outer electrode also being adjacent to and electrically connected to, or in electrical contact with, the thin metal foil packaging; and an electrolyte dispersed within the inner electrode, the first and second outer electrodes, and the first and second porous separators.

In some embodiments of the electrochemical cell, the inner current collector is a positive current collector, the inner electrode is a positive electrode, the first and second outer electrodes are both negative electrodes and the thin metal foil packaging is a negative outer current collector.

The present invention also provides a method for making the electrochemical cell stack described above which comprises forming the metal-to-metal welded seal by a technique selected from the group consisting of resistance welding, laser welding and ultrasonic welding. In one embodiment of this method for making the electrochemical cell, forming the metal-to-metal welded seal is accomplished by laser welding. Furthermore, the laser welding may be performed at a scan speed of at least 0.1 meter per second (m/s).

BRIEF DESCRIPTION OF THE DRAWINGS

For a more complete understanding of the present invention, reference is made to the following detailed description of exemplary embodiments considered in conjunction with the accompanying drawings, in which like structures are referred to by like numerals throughout the several views, and in which.

DETAILED DESCRIPTION OF THE INVENTION

The present invention relates to an electrochemical cell having an electrochemical stack and thin metal foil packaging that contains and is bonded to the stack, where the thin metal foil packaging is more efficiently designed and produced than in previous conventional pouch cells. More particularly, as will be described in further detail hereinafter, one or more metal foil sheets are directly welded together along their open free edges to form the thin metal foil packaging having an hermetic or near hermetic metal-to-metal welded seal that is in close proximity to the electrochemical stack contained therein. Additionally, the one or more metal foil sheets are bonded and in electrical contact with electrodes of the electrochemical stack so that the thin metal foil packaging is both packaging and current collector for the electrochemical cell.

As used herein, the term "near hermetic" means a packaging has a WVTR of less than about 100 g/m²/24 hrs, at 25° C. and 40% R.H, both based on a packaging thickness of 1 mil (i.e. one thousandth of an inch, or 0.001 inch). For example, without limitation, a near hermetic packaging is a packaging that has a WVTR of less than about 75, or less than about 50, or less than about 25, or less than about 10, or less than about 5, or less than about 2, or less than about 1, or even less than about 0.1 g/m²/24 hrs, at 25° C. and 40% R.H and a 1 mil thickness.

As used herein, the term "hermetic" means a packaging has a WVTR of less than about 0.01 g/m²/24 hrs, at 25° C. and 40% R.H, both based on a packaging thickness of 1 mil (i.e. one thousandth of an inch, or 0.001 inch). For example, without limitation, a near hermetic packaging is a packaging that has a WVTR of less than about 0.005, or less than about 0.001, or less than about 0.0005, or less than about 0.0001, or less than about 0.00005, or even less than about 0.00001 g/m²/24 hrs, at 25° C. and 40% R.H and a 1 mil thickness.

In embodiments of the present invention, there is no interior thermoplastic sealant layer at the free edges of the metal foil sheets and, therefore, there is no thermoplastic sealant within the metal-to-metal seals of the thin metal foil packaging described, except at the point of electrical tab penetration of the inner current collector in order to maintain electronic isolation of said tab, and completed herein. Elimination of thermoplastic sealant from the seal of the thin metal foil packaging provides a more secure seal, thereby reducing risk of escape of electrolyte from the cell stack or ingress of water from the environment through the seal. As such, the metal seal created with the thin metal foil packaging is truly hermetic, in contrast to the thermoplastic polymer seals utilized on traditional pouch cells which can never, by definition, be truly hermetic. Furthermore, in embodiments of the present invention, the metal foil sheet, or sheets, that form the packaging are in electrical contact with either the positive or the negative electrode of the electrochemical cell and, thereby, serve as a current collector for the electrode with which they are in contact, as will also described in detail hereinafter. Another feature of embodiments of the electrochemical cell described and contemplated herein is that the seals created by the aforesaid welding together of the edges of the metal foil sheets have narrower widths and are closer to the electrochemical cell stack than in conventional pouch electrochemical cells. The aforesaid novel design elements provide electrochemical cells, and batteries comprising one or more such cells, having high energy capacity but with a cell thickness of less than about 1 millimeter (mm). Additionally, the aforesaid electrochemical cells, and batteries comprising one or more such cells, have a capacity less than about 10 Ah, such as less than about 2 Ah, or even less than about 500 mAh.

It is noted that, as will be recognized by persons of ordinary skill in the relevant art, while various embodiments of the electrochemical cell contemplated herein are described below as being single cells, the technical features described herein are also applicable to electrochemical batteries which may comprise a single electrochemical cell, or multiple electrochemical cells where the electrode (either positive or negative) of each cell that is to be connected to the metal foil sheet or sheets of the thin metal foil packaging is electrically connected to the electrodes of the other cells in the battery inside the thin metal foil packaging. Also, while the electrochemical cell is described herein as having chemistry and active materials suitable for lithium and lithium-ion cells and batteries, it should be understood that the beneficial features and technology described herein may also be applicable to electrochemical cells having other chemistries and different active materials for the functional components. Lithium and lithium-ion cells and batteries are discussed at length in Tarascon, J. M., and M. Armand. "Issues and Challenges Facing Rechargeable Lithium Batteries." *Nature Magazine* 414 (2001): 359-67 and Scrosati, B., and J. Garche. "Lithium Batteries: Status, Prospects and Future." *Journal of Power Sources* 195 (2010): 2419-430, both of which are hereby incorporated by reference herein in their entireties.

Figure 1:
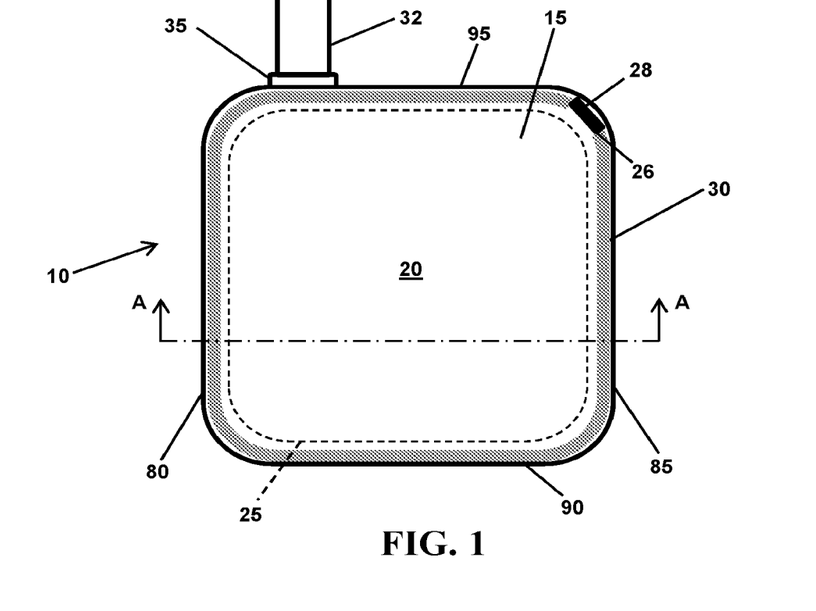
FIG. 1 is a schematic top plan view of an embodiment of an electrochemical cell.
Figure 2:
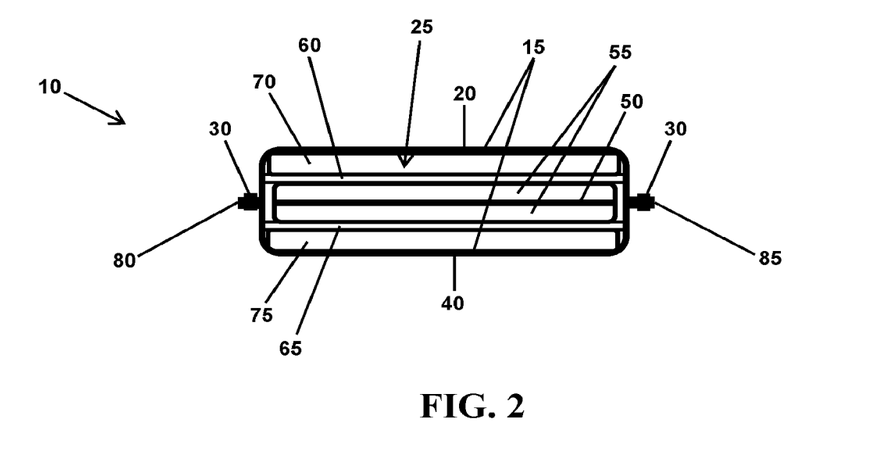
FIG. 2 is a schematic cross-sectional side view of the electrochemical cell of FIG. 1, taken along line A-A and looking in the direction of the arrows.
Figure 3:
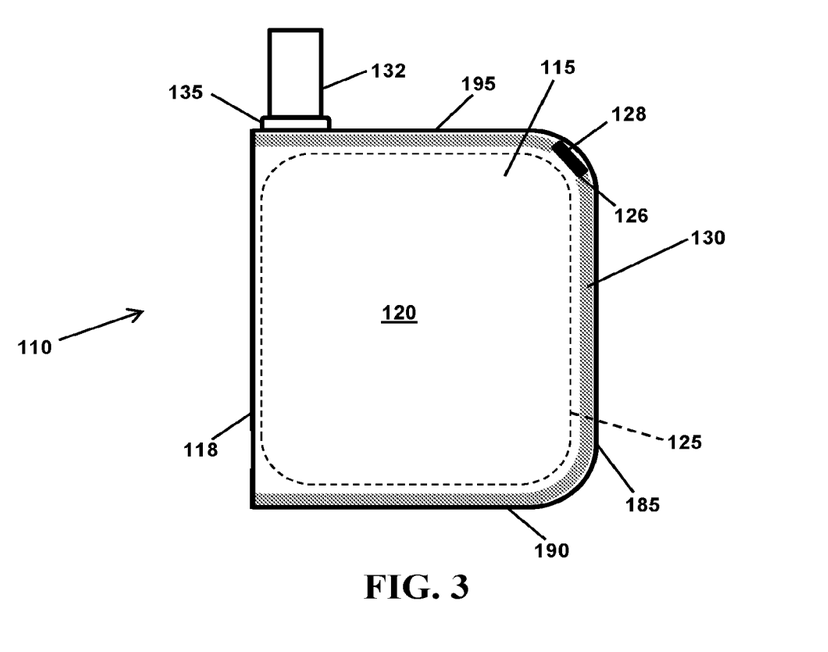
FIG. 3 is a schematic top plan view of another embodiment of an electrochemical cell having one edge of the packaging defined by a fold of metal foil.

With reference now to FIGS. 1 and 2, schematic top and side views of a generalized embodiment of an electrochemical cell 10 are provided. More particularly, as shown in FIG. 1 the electrochemical cell 10 includes a thin metal foil packaging 15 formed by at least one sheet of metal foil 20. An electrochemical cell stack 25 (not visible in FIG. 1, but shown in phantom) is contained within and bonded to the thin metal foil packaging 15. The electrochemical cell 10 has an hermetic metal-to-metal welded seal 30 around at least a portion of the perimeter of the thin metal foil packaging 15. In some embodiments, the thin metal foil packaging 15 may comprise two sheets of metal foil, such as top and bottom metal foil sheets 20, 40, which are best viewed in FIG. 2 since in FIG. 1 the bottom sheet 40 is obscured by the top sheet 20. In such embodiments the top and bottom metal foil sheets 20, 40 have been welded together, metal-to-metal, along all four free edges 80, 90, 85, 95, with the electrochemical cell stack 25 therebetween, to form the welded seal 30 as seen in FIG. 1. Alternatively, FIG. 3 shows a top plan view of an embodiment of the electrochemical cell 110 in which the thin metal foil packaging 115 has been formed by folding a single sheet of metal foil 120 around the electrochemical cell stack 125, resulting in a folded edge 118. In this alternative embodiment, the electrochemical cell stack 125 is inserted within the folded metal foil sheet 120, proximate the folded edge 118, and the free edges 180, 190, 185, 195 of the folded metal foil sheet 120 are aligned and sealed with one another to form the hermetic metal-to-metal welded seal 130 which extends around about three quarters (e.g., about 75% by length) of the perimeter of the thin metal foil packaging 115.

With reference back to the embodiment of FIGS. 1 and 2, the location of an electrolyte activation port 26 is shown in the top view of FIG. 1, at one corner of the thin metal foil packaging 15. The port 26 is shown in FIG. 1 already closed with a welded seal 28. During fabrication of the electrochemical cell 10, when the free edges of the metal foil sheets 20, 40 are welded together to form the welded seal 30, the electrolyte activation port 26 is left open temporarily to allow electrolyte to be provided to the electrochemical cell stack 25 inside the packaging 15. To complete assembly of the electrochemical cell 10, after electrolyte is provided to the electrochemical cell stack 25, the electrolyte activation port 26 is sealed by welding which completes the hermetic or near hermetic welded seal 30. In some embodiments, such as electrochemical cells containing solid state or gelled electrolytes, the electrolyte will be included during the initial construction of the electrochemical stack 25 and, therefore, the electrolyte activation port 26 is not required and may be omitted from the packaging 15.

In addition, an electrode tab 32 is visible protruding from the thin metal foil packaging 15 and through a sealant 35 in the top view of FIG. 1. Polymer, ceramic, organic-inorganic composites or glass sealant 35 may be used to electrically insulate the electrode tab 32 from the thin metal foil packaging 15 and also to seal the thin metal foil packaging 15 against the environment. The nature and purpose of the electrode tab 32 will be described in further detail hereinafter.

With reference now to FIG. 2, which provides a schematic cross-sectional view of the electrochemical cell 10 of FIG. 1, taken along line A-A and looking in the direction of the arrows, a single electrochemical cell stack 25 is shown contained in the thin metal foil packaging 15. All the components inside the thin metal foil packaging 15 are considered to be functional components of the electrochemical cell stack 25 and their arrangement will now be discussed. More particularly, in the embodiment shown in FIG. 2, the electrochemical cell stack 25 includes an inner current collector 50, an inner electrode 55 electrically connected to or in electrical contact with the inner current collector 50, and first and second porous separators 60, 65 positioned on opposite sides of the inner electrode 55. The inner current collector 50 is in electrical contact with, and may actually include an extended portion that forms, the electrode tab 32 that protrudes from the thin metal foil packaging 15 as mentioned above (see FIG. 1). In some embodiments, the inner current collector 50 and the inner electrode 55 may be positive and, thus, in such embodiments, the electrode tab 32 will also be positive. In other embodiments, the inner current collector 50 and the inner electrode 55 may be negative and, in such embodiments, the electrode tab 32 will also be negative.

Additionally, as shown in FIG. 2, the electrochemical cell stack 25 further includes a first outer electrode 70 positioned on an opposite side of the first porous separator 60 from the inner electrode 55 so as to be adjacent the thin metal foil packaging 15. A second outer electrode 75 is positioned on an opposite side of the second porous separator 65 from the inner electrode 55 so as to also be adjacent the thin metal foil packaging 15. In embodiments where the inner current collector 50 and the inner electrode 55 are positive, the first and second outer electrodes 70, 75 are negative. Alternatively, in embodiments, where the inner current collector 50 and the inner electrode 55 are negative, the first and second outer electrodes 70, 75 are positive. Furthermore, it is noted that the terms "inner" and "outer" are used to describe the various current collectors and electrodes of the electrochemical stack 25 are intended to differentiate between the inner current collector 50 and the inner electrode 55, which are located within the electrochemical stack 25 and separate from the thin metal foil packaging 15, and the first and second outer electrodes 70, 75, which form the outer portion of the electrochemical stack 25 so that they are adjacent to the thin metal foil packaging 15 and can be easily electrically connected to or be in electrical contact with the thin metal foil packaging 15.

Another functional component of the electrochemical cell stack 25 is the electrolyte (not shown), which is dispersed within the inner electrode 55, outer electrodes 70, 75, and the separators 60, 65. In some embodiments, the electrolyte may be a liquid electrolyte. In some embodiments, the electrolyte may be a solid state electrolyte, or even a gel electrolyte. In the case of a solid state electrolyte, the electrolyte itself may be utilized as one or both of the separators 60, 65 as long as the electrolyte is mechanically capable of maintaining the separation between the positive and negative electrodes.

The various aforesaid functional components of the electrochemical cell stack 25 are in contact and adhered, or otherwise physically bonded, with one other sequentially by any method known now or in the future to persons of ordinary skill in the relevant art. Bonding may be accomplished by mechanical or chemical means. For example, bonding between the functional components of the electrochemical stack 25 may be suitably accomplished by placing thermoplastic polymers among the functional components (e.g., within the inner electrode 55 and each of the first and second porous separators 60, 65, as well as within the first outer electrode 70 and the first porous separator 60, and between the first outer electrode 70 and the associated metal foil sheet 20), and then applying thermal energy and pressure to form a melt bond between the respective functional components. Suitable processes to accomplish bonding of electrodes to form electrochemical cell stacks are provided, for example without limitation, by Tarascon, J. M., et al. "Performance of Bellcore's Plastic Rechargeable Li-ion Batteries." *Solid State Ionics* 86-88 (1996): 49-54, and by Armand, M. (2001) (cited above) and Stephan, A. M. "Review on Gel Polymer Electrolytes for Lithium Batteries." *European Polymer Journal* 42 (2006): 21-42, both of which are hereby incorporated by reference herein in their entireties.

Positive electrodes (whether the inner electrode 55, or the first and second outer electrodes 70, 75) may be made of a suitable active positive electrode material along with carbon and a suitable binder. Negative electrodes (whether the inner electrode 55, or the first and second outer electrodes 70, 75) may be of similar composition, i.e., suitable active negative electrode material, carbon and binder or, alternatively, they could be made of a metal. For lithium batteries, the exact chemistries useful for making negative electrodes are well known to those of the art. For example, see Zhang, W. "A review of the electrochemical performance of alloy anodes for lithium-ion batteries." *Journal of Power Sources* 196 (2011): 13-24, and Huggins, Robert A. "Chapter 18." *Energy Storage*. New York: Springer (2010), both of which are hereby incorporated by reference herein in their entireties. Similarly, for lithium batteries, the exact chemistries useful for making positive electrodes are well known to those of the art. For example, see Ohzuku, T. and Brodd R. J., "An overview of positive-electrode materials for advanced lithium-ion batteries." *Journal of Power Sources* 174 (2007): 449-456, and Ellis B., et al., "Positive Electrode Materials for Li-ion and Li-Batteries," *Chem. Mater.* 2010, 22: 691-714, both of which are hereby incorporated by reference herein in their entireties. The positive active electrode material for positive electrodes may, for example, be made of layered transition metal oxides such as $LiCoO_2$, $LiNiO_2$, or other layered materials comprised of other first row transition metals (i.e., Sc, Ti, V, Cr, Mn, Fe, Cu and Zn) and Al to replace the Co or Ni in various proportions. Other suitable positive electrode materials include, but are not limited to, $LiMn_2O_4$ based spinels operating at approximately 4V vs. Li/Li+, as well as Mn based spinels such as $LiMn_{1.5}Ni_{0.5}O_4$ which operate at higher voltages approaching 4.7 vs. Li/Li+, and also metal fluoride electrodes such as those based on $FeF_2$, $FeF_3$, $BiF_3$ and associated compositions formed into nanocomposites. See, e.g., Amatucci, G. G. and Pereira, N. "Fluoride based electrode materials for advanced energy storage devices." *Journal of Fluorine Chemistry* 128 (2007): 243-262, which is hereby incorporated by reference herein in its entirety.

Negative active electrode materials suitable for making negative electrodes for lithium-based batteries (see, e.g., Huggins, R. A. (2010) cited above) include for example, without limitation, graphite, hard carbons, cokes, and metal alloys (see, e.g., Zhang, W. (2011) cited above), especially those comprised of Si, Al, and Ge. Carbon additives such as carbon blacks, graphites, carbon nanotubes and graphene are added to enhance the electronic conductivity. Suitable binders include those comprised of, for example, without limitation, polyvinylidene fluoride (PVDF), polyvinylidene fluoride-hexafluoropropylene (PVDF-HFP), polyimides, cellulose, polytetrafluoroethylene (PTFE), polyacrylonitrile (PAN), poly(ethylene oxide) (PEO), and others.

With reference still to FIG. 2, the thin metal foil packaging 15 includes at least one metal foil sheet 20, such as the first and second metal foil sheets 20, 40 shown. The thin metal foil packaging 15 also has at least one free edge, such as the free edges 80, 90, 85, 95 shown, that is hermetically sealed with a metal-to-metal welded seal 30 that extends at least partially around the perimeter of the electrochemical cell 10. Furthermore, each of the first and second outer electrodes 70, 75 is in contact with at least one metal foil sheet 20, 40, respectively, of the thin metal foil packaging 15 so that the thin metal foil packaging 15 also functions as the negative current collector for the first and second outer electrodes 70, 75. This design completely eliminates an entire component, i.e., the negative current collector, from the electrochemical cell 10, which decreases mass and volume while increasing efficiency of the present electrochemical cell 10 as compared to those of conventional design.

At this point, although it is likely already understood by persons of ordinary skill in the relevant art, it is noted that the electrochemical cell 10 may be constructed with suitable active materials for the electrodes and electrolyte for operation as a secondary cell. As mentioned above, in the embodiment of the electrochemical cell 10 shown in FIGS. 1 and 2, the inner current collector 50 and associated electrode 55 may be either positive or negative. Similarly, the first and second outer electrodes 70, 75 may be either positive or negative, but they must both be either positive or negative, and the metal foil sheets 20, 40 of the thin metal foil packaging 15 which are in electronic contact with each other and both of the first and second outer electrodes 70, 75 will function as their associated current collector and have the same charge as the first and second outer electrodes 70, 75. Finally, of course, when the inner current collector 50 and associated electrode 55 is negative, the first and second outer electrodes 70, 75 and the metal foil sheets 20, 40 will be positive, and vice versa. As understood by persons of ordinary skill, the electrode materials selected to make the electrode is a factor that determines whether each electrode is positive or negative.

Accordingly, in one embodiment of the electrochemical cell which comprises an electrochemical cell stack contained within a thin metal foil packaging comprising at least one metal foil sheet, the functional components of the cell stack are sequentially arranged and bonded, as follows: the metal foil sheet is bonded to a first negative electrode, the first negative electrode is bonded to a first separator, the first separator is bonded to a positive electrode, the positive electrode is bonded to a second separator, the second separator is bonded to a second negative electrode, and the negative electrode is bonded to the metal foil sheet (or possibly to a second metal foil sheet). Moreover, it is possible for a single negative electrode (i.e., a single physical element that is extended or folded around the positive electrode and separators such that the electrodes are physically and electrically separated from one another) to serve as the first and second negative electrodes in the electrochemical cell stack. In another embodiment, the functional components of the cell stack may be sequentially arranged and bonded, as follows: the metal foil sheet is bonded to a first positive electrode, the first positive electrode is bonded to a first separator, the first separator is bonded to a negative electrode, the negative electrode is bonded to a second separator, the second separator is bonded to a second positive electrode, and the second positive electrode is bonded to the metal foil sheet (or possibly to a second metal foil sheet). Moreover, it is possible for a single positive electrode (i.e., a single physical element that is extended or folded around the negative electrode and separators such that the electrodes are physically and electrically separated from one another) to serve as the first and second negative electrodes in the electrochemical cell stack.

Suitable metals for the metal foil sheets 20, 40 are highly dependent on the type of electrochemical cell and the electrochemical compatibility with the adjacent electrode. Suitable metals for the metal foil sheets 20, 40 for lithium-based cells and batteries, for example include, without limitation, at least one metal selected from the group consisting of Al, Ni, Cu, Mo, Ta, Au, Pd, or Ti, or alloys thereof. More particularly, in embodiments wherein the metal foil sheets 20, 40 of the thin metal foil packaging 15 are utilized as a negative current collector, then Ni, Cu, Ta, Mo, and Ti and their respective alloys are all suitable metals from which to make the metal foil sheets 20, 40, with Ti being particularly suitable. In other embodiments wherein the metal foil sheets 20, 40 of the packaging 15 are utilized as a positive current collector, then suitable metals for making them include Al, Au, Pt, Pd, Ti, stainless steels and their respective alloys, with Al being particularly suitable. As will be understood by persons of ordinary skill in the relevant art, where alloys are used for the metal foil sheets 20, 40, they should be electrochemically compatible with one another. The metal foil sheets 20, 40 may have a thickness of less than about 50 microns, such as for example, from about 10 to about 40 microns, which is notably an order of magnitude thinner than that of conventional multilayer packaging materials. For example, without limitation, the metal foil sheets 20, 40 may have a thickness of from about 10 to about 35 microns, such as from about 10 to about 30 microns, or from about 10 to about 25 microns, or from about 15 to about 35 microns, or from about 15 to about 30 microns, or even from about 15 to about 25 microns. In some embodiments, as is known in the art, the metal foil sheets 20, 40 to be used to make the thin metal foil packaging 15 may be molded by press forming to include a well or depression (not shown per se) therein that is sized and shaped to receive the electrochemical cell stack 25 therein.

Persons of ordinary skill in the relevant art will understand that the proper choice of metals to use for the metal foil sheets 20, 40 depends at least in part upon their electrochemical stability. Some guidance on this aspect of metal foil material selection is provided for example by Whitehead, A. H. and Schreiber M. "Current Collectors for Positive Electrodes of Lithium-Based Batteries." *Journal of the Electrochemical Society* 152 (11) (2005): A2105-A2113, which is hereby incorporated by reference herein in its entirety. Additionally, the metal foil sheets 20, 40 must be capable of being welded together to form the hermetic or near hermetic welded seam 30, such as for example by laser, resistance, or ultrasonic welding. Any of these welding methods will form suitable hermetic or near hermetic metal-to-metal welded seams 30 on the thin metal foil packaging. Resistance welding is generally performed by applying an electrical current to the material to be welded, whereby the heat required to weld the material is generated by the electrical resistance of the material together with the force applied to hold the materials together during welding. Laser welding typically involves using a concentrated energy source, i.e., a laser, and is known to produce narrow, deep welds at high welding rates. Thus, for example, where laser welding is to be employed, the selected metal should enable good absorbance of the laser energy imparted upon the metal foil sheets 20, 40 during performance of the welding which, as is known in the art, will also be a function of the laser wavelength utilized.

Although high temperatures are known to sometimes damage the components of temperature sensitive electrochemical stacks (e.g., see the stacks 25, 125 shown in FIGS. 1 and 3, respectively), it has surprisingly been found that using the foregoing techniques to form the desired hermetic or near hermetic welded seams 30 does not result in damage to the electrochemical stacks 25, 125. In other words, even though the welding was performed at temperatures that are magnitudes greater than temperatures at which temperature sensitive electrochemical stacks are otherwise known to sustain damage, and even though the welded seams were formed very close to the electrochemical stacks, no such damage to the stacks occurred. Without intending to be limited by theory, it is believed that this is because the energy (and resulting heat) applied during the welding techniques described and contemplated herein, especially laser welding, is focused on the portions of the metal foil sheets 20, 40 to be joined and because the welding proceeds at a rapid rate, the heat produced during these welding techniques is concentrated and dissipates quickly so that the electrochemical stack escapes damage.

As described above, each metal foil sheet 20, 40 must be in contact with and bonded to an associated one of the first and second outer electrodes 70, 75, respectively (see, e.g., arrangement shown in FIG. 2.). This can be achieved through the use of a variety of acid modified polymers that can be placed on the metal foil sheets 20, 40, or the electrodes 70, 75, or both. The acid groups of said polymers will react with the native oxides on the surface of the foil sheets 20, 40 to create a bond when heat and pressure are applied thereto. Such polymers may also be mixed with electronically conductive additives such as carbon to improve electronic conductivity between the current collector package and the electrode. Examples of such polymers are, but not limited to, and acid modified polyolefin such as EB-20 Acheson, (commercially available from Henkel of Dusseldorf, Germany and Rocky Hill Conn., USA) and an acid modified PVDF homo- or co-polymer such as Kynar® ADX (commercially available from Arkema of King of Prussia, Pennsylvania, Pa.).

In order for the invention to have high energy capacity and thus utility for thin small applications, the width of the welded seal 30 on the thin metal foil packaging 15 should be as small as possible, i.e., less than about 1 mm wide, or less than about 0.5 mm wide, or even less than about 0.250 mm wide. To conserve space and volume, the welded seal 30 on the thin metal foil packaging 15 should also be located very close to the electrochemical cell stack 25, i.e., less than about 5 mm away from the cell stack 25, such as less than about 3 mm away, or less than about 2 mm away, or even less than about 1 mm away. This requires exceptionally high temperatures to weld the foils together. For metal foil sheets 20, 40 made of Ti, for example, a high melting temperature of about 1668° C. is necessary. Damage to the electrochemical cell stack has been observed to occur when located only a few millimeters away from the laser seal and commences at approximately 120° C. (which is the degradation temperature of the separator material typically utilized in an electrochemical cell stack). Based on the foregoing circumstances, it was previously believed that using laser welding to form the seal within a few millimeters of an electrochemical cell or battery of high polymer content would be impossible. However, it has surprisingly been found that for electrochemical cells in accordance with the present invention, formation of multiple hermetic metal-to-metal welds using high melting point Ti within a few millimeters of the electrochemical cell stack was successfully accomplished without affecting the functionality of the electrochemical cell stack. This fabrication was accomplished using a high speed laser, i.e., in which laser scanning occurs at a speed of at least about 0.1 meter per second (m/s). Thus, it is recommended that the laser welding be performed, for example, without limitation, at a scan speed of at least about 0.05 m/s, or at least about 0.3 m/s, or at least about 0.6 m/s, or at least about 1.2 m/s, or at least about 2.4 m/s, or even at least about 5 m/s.

While it is not necessary that all of the seals around the entire perimeter of the electrochemical cell 10 must comprise a welded seal 30, it is recommended that at least 25% of the total length, based on the sum of the lengths of all the seals around the perimeter of the electrochemical cell, should be metal-to-metal hermetic or near hermetic welded seals 30 formed by welding as described hereinabove. For example, without limitation, the seals around the perimeter of the electrochemical cell may comprise at least about 35% by length based on the total length of all the seals around the perimeter of the electrochemical cell, or at least about 40%, or at least about 50%, or at least about 65%, or at least about 80%, or at least about 90%, or even at least about 95%, of metal-to-metal hermetic or near hermetic welded seals 30.

While at least one exemplary embodiment has been presented in the foregoing detailed description, it should be appreciated that various additional embodiments and modification are possible that remain within the intent and function of the invention described and contemplated herein. It should also be appreciated that the exemplary embodiment or embodiments are merely examples, and are not intended to limit the scope, applicability, or configuration of the invention in any way. The foregoing detailed description provides those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

EXAMPLE

Fabrication of Electrodes

The positive electrode of a Li-ion battery was fabricated by preparing a positive electrode solution by mixing 79.5 wt % $LiCoO_2$, 5.6 wt % 2801 PVDF-HFP co-polymer, 3.9 wt % Super-P (Timacal Graphite & Carbon headquartered in Bodio, Switzerland) carbon black and 11.1 wt % propylene carbonate (PC) in a blender with acetone for 10 minutes.

The positive electrode solution was poured into a caster box with the appropriate gap setting to establish a positive electrode target film density of 19.4 milligrams per centimeter squared ($mg/cm^2$) and the required thickness to obtain an overall matching ratio of 2.2-2.4 (positive:negative weight ratio). The resulting positive electrode was ultimately porous, as described hereinbelow The negative electrode of the Li-ion battery was fabricated by preparing a negative electrode solution by mixing 70.4 wt % Mesophase Microbead "MCMB" (Osaka Gas of White Plains, N.Y., USA) 25/28 graphite, 6.9 wt % 2801 PVDF-HFP co-polymer, 2.7 wt % SP carbon black, and 20% propylene carbonate (PC) in a blender with acetone for 10 minutes.

The negative electrode solution was poured into a caster box with the appropriate gap setting to establish a negative electrode target film density of 9.1 $mg/cm^2$ and the required thickness to obtain an overall matching ratio of 2.2-2.4 (positive:negative weight ratio). The resulting negative electrode was ultimately porous, as described hereinbelow.

Fabrication of the Electrochemical Cell Stack

The negative electrode fabricated above was predensified in a laminator at 120° C. and 20 pounds per square inch (psi). The negative electrode was then die cut to desired size of approximately 36 mm×32 mm.

A 25 micron thick Al grid was sprayed with 0.75 $mg/cm^2$ of Acheson DAG® EB-012 ((commercially available from Henkel of Dusseldorf, Germany and Rocky Hill Conn., USA).

The positive electrode fabricated above was predensified in a laminator at 125° C. and 25 psi. The positive electrode was then laminated to the aforementioned Al grid at 130° C. and 30 psi. The positive electrode was die cut to desired size of 35 mm×32 mm allowing for an Al tab.

A coated polyolefin separator (Celgard A114-1200-A, commercially available from Celgard of Charlotte, N.C., USA) was die cut to desired size of approximately 37 mm×33 mm, which was larger than the negative electrode (but smaller than the pocket depression in the foil pan described below).

The electrochemical cell stack consisting of an aligned stack of functional components as follows: negative electrode/separator/positive electrode/separator/negative electrode, was laminated at 105° C. and 20 psi.

The entire cell stack was extracted twice with diethyl ether for 10 minutes and dry at 70° C. for 10 minutes (min) to remove the PC. Upon PC extraction, porous voids were formed in the positive and negative electrodes and, upon addition of electrolyte, the porous voids were filled with electrolyte.

Fabrication of Top and Bottom Foil Sheets to make the Thin Metal Foil Packaging

To form top and bottom foil sheets to make the thin metal foil packaging, two squares were cut from a sheet of Ti metal foil and cleaned with acetone. Utilizing a die, a pocket depression was formed in each of the top and bottom Ti metal foil sheets to a depth of 0.005" and having approximate dimensions of 39 mm×35 mm. A tab depression for a tab outlet was also formed in the top Ti metal foil sheet. Within the pocket depression, an adhesion coat of density 0.21 $mg/cm^2$ made from a 1% SP carbon black/ADX 2250 acetone solution was added by a transfer printing technique.

Surlyn polymer tape (a polyethylene or polypropylene-based polymer commercially available from DuPont of Wilmington, Del., USA) was adhered to the pocket depressions and also, separately, to each side of the Al tab. The electrochemical cell stack prepared earlier (described above) was hot pressed to the lower Ti metal foil sheet, in the pocket depression, at 105° C. and 40 psi.

Formation of the Laser Seal and Fabrication of an Electrochemical Cell Assembly

The top foil sheet (described above) was placed on top of the bottom foil sheet which had the cell stack assembly already adhered in the pocket depression, and the four free edges of the foil sheets were aligned with one another in preparation for laser welding. The four free edges, excluding the tab depressions and an electrolyte activation port, were welded together to form the thin metal foil packaging, using laser energy from a scanned near infrared 100 Watt (W) 1070 nanometer (nm) SPI redPower R4-HS laser (commercially available from SPI Lasers of Southhampton, United Kingdom), through a telecentric lens with approximate spot size of 30 microns.

The weld conditions were: internal closed pulse weld, 40 pulse shape equalization (PSE), 45% output power, 20 KilohHertz (KHz), 37.5 us, and linear speed of 0.4 meters per second (m/s). After forming 3 welds of approximately 75 microns width each, for a total welded seal width of 225 microns, the last pass of the laser was utilized to cut away excess metal from the free edges of the packaging at 40 PSE, 70% output power, 50 KHz, 20 us, 0.1 m/s linear speed. The tab protrusion opening left by the unwelded tab depressions was then heat sealed using a simple impulse heat sealer at 180° C. 70 psi for 6 seconds to adhere the Surlyn sealant tape to the top foil sheet.

The resulting electrochemical cell assembly has top and bottom Ti metal foil sheets welded together at their free edges to form the thin metal foil packaging with the electrochemical cell stack inside the packaging, the tab protrusion opening having been sealed and the electrolyte activation port remaining open.

Addition of Electrolyte to Electrochemical Cell Assembly

The electrochemical cell assembly fabricated above was dried in vacuum chamber at 99° C. for 15 hrs. 100 microliters (μl) of an electrolyte comprising 1M $LiPF_6$ ethylene carbonate/ethyl methyl carbonate (30%/70% wt) electrolyte of <20 parts per million (ppm) water was added through the electrolyte activation port while in an argon filled glovebox. The electrochemical cell was then hot pressed at 105° C. and 20 psi for 30 seconds to ensure the coated top foil sheet was securely bonded to the negative electrode of the electrochemical stack. The electrolyte activation port was then sealed using a micro resistance welder with sequential seals at 400 Amps overlapping each pulse with 250 micron increments.

Performance of Sample Thin Metal Foil Electrochemical Cells

Two electrochemical cells ("Cell A" and "Cell B"), each prepared as described above and having dimensions of 39.5 mm×35.5 mm and <350 microns thick, with the welded seal having a width of 0.250 mm and being located approximately 1.8 mm from the cell stack, were cycled.

Figure 4:
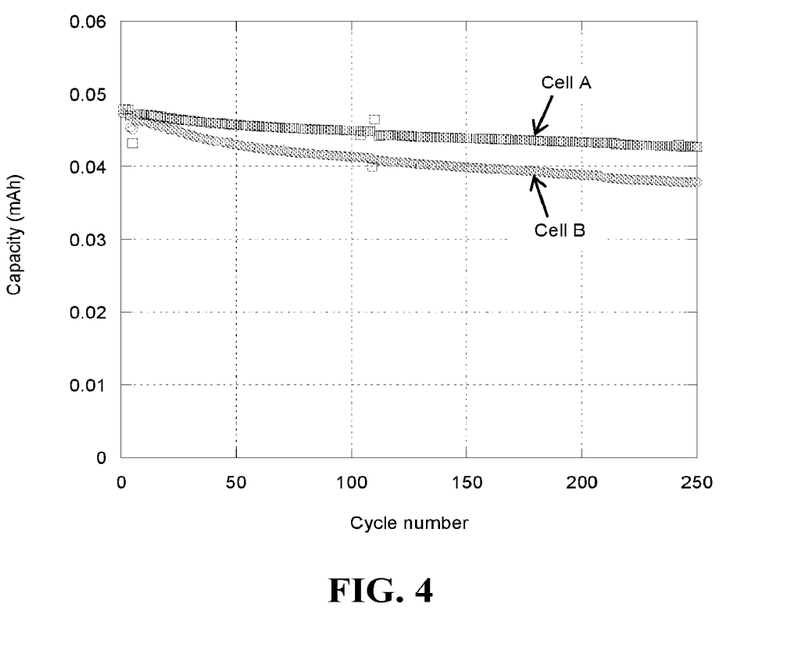
FIG. 4 is a plot of capacity as a function of cycle number for two embodiments of the electrochemical cell in accordance with the present invention.

Each of Cell A and Cell B was cycled at 8 mA charge to 4.15V, then held at 4.15V until a current of 0.8 mA was reached. Each cell was then discharged at 8 mA until a voltage of 3V was reached. FIG. 4 shows the capacity vs cycle number for Cell A and Cell B fabricated and tested as described above. This capacity represents an extraordinarily high volumetric energy density in excess of 400 Watt*hour per liter (Wh/L) for a cell which is less than 0.5 cubic centimeters (cc) in volume. This is well over a factor of 2× of what can be achieved utilizing previous conventional pouch electrochemical cell designs.

We claim:
1. A method comprising:
providing a metal foil packaging comprising at least one sheet of metal foil;
bonding the metal foil packaging to an electrochemical cell stack,
wherein the metal foil packaging has a perimeter extending around at least a portion of the electrochemical cell stack;
wherein an electrode tab extends from the electrochemical stack through the metal foil packaging;
laser welding the metal foil packaging to form a metal-to-metal welded seal,
wherein the laser welding occurs at a speed of at least 0.1 m/s,
wherein the metal-to-metal seal is less than 1 mm away from the electrochemical cell stack,
using a sealant, heat sealing the electrode tab to the metal foil packaging such that:
the electrode tab is electrically insulated from the metal foil packaging, and
the thin metal foil packaging is hermetically sealed against an external environment to form an electrochemical cell.
2. The method of claim 1, wherein the at least one sheet of metal foil is a single sheet of metal foil.
3. The method of claim 2, further comprising:
folding the single sheet of metal foil around the electrochemical cell stack so as to result in a folded edge and three free edges, and
laser welding the three free edges.
4. The method of claim 1, wherein the electrochemical cell has a cell thickness of less than 1 millimeter.
5. The method of claim 1, wherein the metal-to-metal welded seal has a width of less than 1 mm.
6. The method of claim 1, wherein the laser welding occurs at a temperature of 1668° C.
7. The method of claim 1, wherein the metal foil packaging is an outer current collector,
wherein the electrochemical cell stack includes an inner current collector,
wherein the electrode tab is an extension of the inner current collector.
8. The method of claim 7, wherein the inner current collector is a positive inner current collector and the metal foil packaging is a negative outer current collector.
9. The method of claim 7, wherein the inner current collector is a negative inner current collector and the metal foil packaging is a positive outer current collector.
10. The method of claim 1, further comprising forming the metal-to-metal seal about at least 75% of a perimeter of the metal foil packaging.
11. The method of claim 1, wherein the electrochemical cell is a lithium-based electrochemical cell.
12. The method of claim 11, wherein the lithium-based electrochemical cell is a lithium-ion electrochemical cell.
13. The method of claim 11, wherein the lithium-based electrochemical cell is rechargeable.
14. The method of claim 1, wherein the at least one sheet of metal foil of the metal foil packaging has a thickness of less than 50 microns.

* * * * *